UNITED STATES PATENT OFFICE.

EDWIN DENSMORE, OF GRAND RAPIDS, MICHIGAN.

CEMENT.

SPECIFICATION forming part of Letters Patent No. 358,338, dated February 22, 1887.

Application filed December 16, 1886. Serial No. 221,701. (No specimens.)

*To all whom it may concern:*

Be it known that I, EDWIN DENSMORE, of Grand Rapids, in the county of Kent and State of Michigan, have invented a new and useful Improvement in Cement; and I do hereby declare that the following is a full, clear, and exact description of the same.

My invention relates to the gluing or cementing of woods or other materials.

My object is, principally, to provide a glue or cement which will withstand the action of moisture; but I have sought also to provide a cement which will not set too quickly, and which may be kept without souring or spoiling.

My invention consists of a combination or mixture of the ordinary glue of commerce, of whiting, and of linseed-oil, together with a carbonate or equivalent preparation of lead or zinc, and, preferably, with litharge, the whole being moistened with water or other diluent or solvent.

In carrying out my invention, I mix the ingredients above specified in the following manner: I take of the ordinary glue, one part; of whiting, one part, and of linseed-oil one part, and with these one-half a part of carbonate of lead, or an equivalent preparation of lead, and, preferably, with these also one-tenth of a part of litharge or equivalent drier, and three parts of water. In mixing these ingredients I dissolve the glue in the water, and cook it in the usual manner. I then mix in a separate vessel the oil, whiting, lead, and litharge, (when litharge is used,) and add this mixture to the glue prepared as above described, thoroughly mixing the ingredients.

While I prefer to use the litharge, as making a better article, it may be omitted without serious injury to the cement.

Red oxide of lead or oxide of zinc may be used in place of the carbonate of lead, but not with as good results.

The cement thus prepared may be used in uniting articles of wood or other materials, in the same manner as ordinary glue is used; but articles united with this cement may be soaked in water or otherwise exposed to moisture without injuriously affecting the cement or weakening its hold upon the wood or other material.

While I have stated above the proportions which I have found to produce the best results, I do not limit myself to them, as they may be varied without losing all the beneficial effects of the mixture.

I claim—

1. The improved cement consisting of glue, whiting, linseed-oil, and the carbonate or oxide of lead or zinc, substantially in the proportions specified.

2. The improved cement consisting of glue, whiting, linseed-oil, and the carbonate or oxide of lead or zinc, and litharge, substantially in the proportions specified.

In testimony whereof I have signed my name to this specification in the presence of two subscribing witnesses.

EDWIN DENSMORE.

Witnesses:
CHAS. L. STURTEVANT,
WALTER DONALDSON.